US010623962B2

(12) United States Patent
Pashkov et al.

(10) Patent No.: US 10,623,962 B2
(45) Date of Patent: Apr. 14, 2020

(54) SYSTEM AND METHOD FOR GEO-LOCATION-BASED MOBILE USER AUTHENTICATION

(71) Applicant: Acronis International GmbH, Schaffhausen (CH)

(72) Inventors: Georgiy Pashkov, Samara (RU); Kirill Davydov, Novovoronezh (RU); Serguei M. Beloussov, Costa del Sol (SG); Stanislav Protasov, Moscow (RU); Mark Shmulevich, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 169 days.

(21) Appl. No.: 15/472,880

(22) Filed: Mar. 29, 2017

(65) Prior Publication Data

US 2017/0289813 A1   Oct. 5, 2017

Related U.S. Application Data

(60) Provisional application No. 62/316,705, filed on Apr. 1, 2016.

(51) Int. Cl.
| H04L 29/06 | (2006.01) |
| H04W 12/06 | (2009.01) |
| H04W 12/12 | (2009.01) |
| H04W 12/00 | (2009.01) |
| H04W 4/02 | (2018.01) |
| H04W 12/10 | (2009.01) |

(52) U.S. Cl.
CPC ........... *H04W 12/10* (2013.01); *H04L 63/083* (2013.01); *H04L 63/107* (2013.01); *H04W 12/06* (2013.01); *H04W 12/00503* (2019.01)

(58) Field of Classification Search
None
See application file for complete search history.

(56) References Cited

U.S. PATENT DOCUMENTS

| 9,271,142 | B1 * | 2/2016 | Broch ................. H04L 41/0813 |
| 2003/0207683 | A1 * | 11/2003 | Lempio ............. H04M 1/72572 |
| | | | 455/422.1 |
| 2005/0055578 | A1 * | 3/2005 | Wright .................... G06F 21/32 |
| | | | 726/4 |
| 2006/0009239 | A1 * | 1/2006 | Ogren .................. H04L 63/107 |
| | | | 455/456.6 |

(Continued)

*Primary Examiner* — Kambiz Zand
*Assistant Examiner* — Arezoo Sherkat
(74) *Attorney, Agent, or Firm* — Arent Fox LLP; Michael Fainberg

(57) ABSTRACT

A system and method is provided for geo-location-based user authentication and data access control. An exemplary method includes receiving a request from a mobile device to access a user account and user data where the request includes current geo-location data that indicates a current geographical location of the mobile device/ An authentication server then determines whether the current geo-location data is within at least one geo zone that indicates approved geographical areas where the mobile device can access the user account and data. If the current geographical location of the mobile device is determined to be within the approved geographical areas, the server will provide the mobile device with access to the requested account and data.

19 Claims, 7 Drawing Sheets

(56) References Cited

U.S. PATENT DOCUMENTS

| | | | |
|---|---|---|---|
| 2006/0253894 A1* | 11/2006 | Bookman | H04L 63/0428 726/2 |
| 2010/0175116 A1* | 7/2010 | Gum | G06F 21/31 726/6 |
| 2011/0252464 A1* | 10/2011 | Sanjeev | H04L 63/107 726/7 |
| 2013/0031598 A1* | 1/2013 | Whelan | G01S 1/725 726/1 |
| 2014/0007182 A1* | 1/2014 | Qureshi | H04L 63/20 726/1 |
| 2014/0099920 A1* | 4/2014 | Belanger | H04L 63/107 455/411 |
| 2014/0304784 A1* | 10/2014 | Harrison | H04L 63/0492 726/5 |
| 2015/0121464 A1* | 4/2015 | Hughes, Jr. | H04L 63/105 726/4 |
| 2016/0210633 A1* | 7/2016 | Epelman | G06Q 20/4016 |
| 2017/0187720 A1* | 6/2017 | Cretella | H04L 63/107 |

\* cited by examiner

SYSTEM AND METHOD FOR GEO-LOCATION-BASED MOBILE USER AUTHENTICATION

CROSS REFERENCE TO RELATED APPLICATIONS

The present application claims priority to U.S. Provisional Application Ser. No. 62/316,705, filed Apr. 1, 2016, and entitled "Geo-Location-Based Mobile User Authentication", the entire contents of which are hereby incorporated by reference.

TECHNICAL FIELD

This disclosure herein generally relates to mobile user authentication, and more particularly, to a system and method for geo-location-based user authentication and data access control.

BACKGROUND

A modern trend for using mobile devices is to access various online user accounts, make electronic payments, execute online transactions, and the like raises. However, these online activities have led to issues relating to the reliability and the security of authentication process. These concerns are not adequately addressed by conventional mobile device technology. For example, the two-factor authentication method is used in which a user is provided additional authentication data (e.g., a one-time password) via SMS ("short message service"). However, this method is not always safe and reliable as the SMS containing the authentication data can be intercepted by malicious entities.

Accordingly, there currently exists a desired to provide a more reliable and secure method for authenticating users before allowing access to online accounts and enable only transactions and the like.

SUMMARY

Accordingly, the present disclosure is directed to a system and method for geo-location-based user authentication and data access control that substantially obviates one or more of the disadvantages of the related art.

In an exemplary aspect, a mobile application is provided that allows for geo-authentication and access to user accounts based on geo-location set by a user or by a group administrator. For example, a user mobile device has GPS or GLONASS or similar module and a special location application that is communicatively connected to the geo-location authentication server. Alternatively, a geo-location authentication module can be implemented on a common data server, where user accounts reside. In an aspect, a user or an administrator sets up access geo-zones, which can be identified as geographic areas where the user is granted access to his or her accounts and data. The size and shape of the geo-zone can be defined on a map (for example, or using some other mathematical representation, e.g., radius around a GPS coordinate point) as a closed area. Moreover, an arbitrary number of geo-zones can be set for one user account or for a user group. In this aspect, the user accounts are protected from an authorized access from a certain geo-location, area or countries.

According to an exemplary aspect, a method is provided for authenticating a mobile device. In this aspect, the method includes receiving, from the mobile device, a request to access at least one of a user account and user data, the request including current geo-location data indicating a current geographical location of the mobile device; determining, by a server, whether the current geo-location data is within at least one geo zone that indicates approved geographical areas where the mobile device can access the requested at least one of a user account and user data; and causing, by the server, the mobile device to obtain access of the requested at least one of a user account and user data if the current geographical location of the mobile device is determined to be within the approved geographical areas.

In another aspect, the method further includes generating the request to access the at least one of a user account and user data by a geo-location software application running on the mobile device.

In another aspect, the method further includes providing a user interface, by the server, that enables a user of the mobile device to define the at least one geo zones that indicates the approved geographical areas where the mobile device can access the requested at least one of a user account and user data.

In another aspect, the method further includes defining, by an administrator of the server, the at least one geo zones that indicates the approved geographical areas where the mobile device can access the requested at least one of a user account and user data.

In another aspect of the method, the request includes user authentication credentials, including a username and password.

In another aspect, the method further includes verifying the username and password after determining that the current geo-location data is within the at least one geo zone; and causing the mobile device to obtain access of the requested at least one of a user account and user data once the username and password are verified.

In another aspect, the method further includes determining, by the server, that the request to access the at least one of a user account and user data is made within an approved time period that indicates an approved time period when the mobile device is within the approved geographical areas.

In another exemplary aspect, a system is provided for authenticating a mobile device. In this aspect, the system includes a server configured to receive, from the mobile device, a request to access at least one of a user account and user data, the request including current geo-location data indicating a current geographical location of the mobile device; and a processor of the server configured to determine whether the current geo-location data is within at least one geo zone that indicates approved geographical areas where the mobile device can access the requested at least one of a user account and user data, and cause the mobile device to obtain access of the requested at least one of a user account and user data if the current geographical location of the mobile device is determined to be within the approved geographical areas.

In another exemplary aspect, a mobile device is disclosed that includes a global position system configured to generate current geo-location data indicating a current geographical location of the mobile device; and a processor configured to: transmit a request, to an authentication server, to access at least one of a user account and user data, the request including the current geo-location data, and access the requested at least one of a user account and user data if the current geographical location of the mobile device is determined by the authentication server to be within a predetermined geographical areas where the mobile device is approved to access the requested at least one of a user account and user data.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
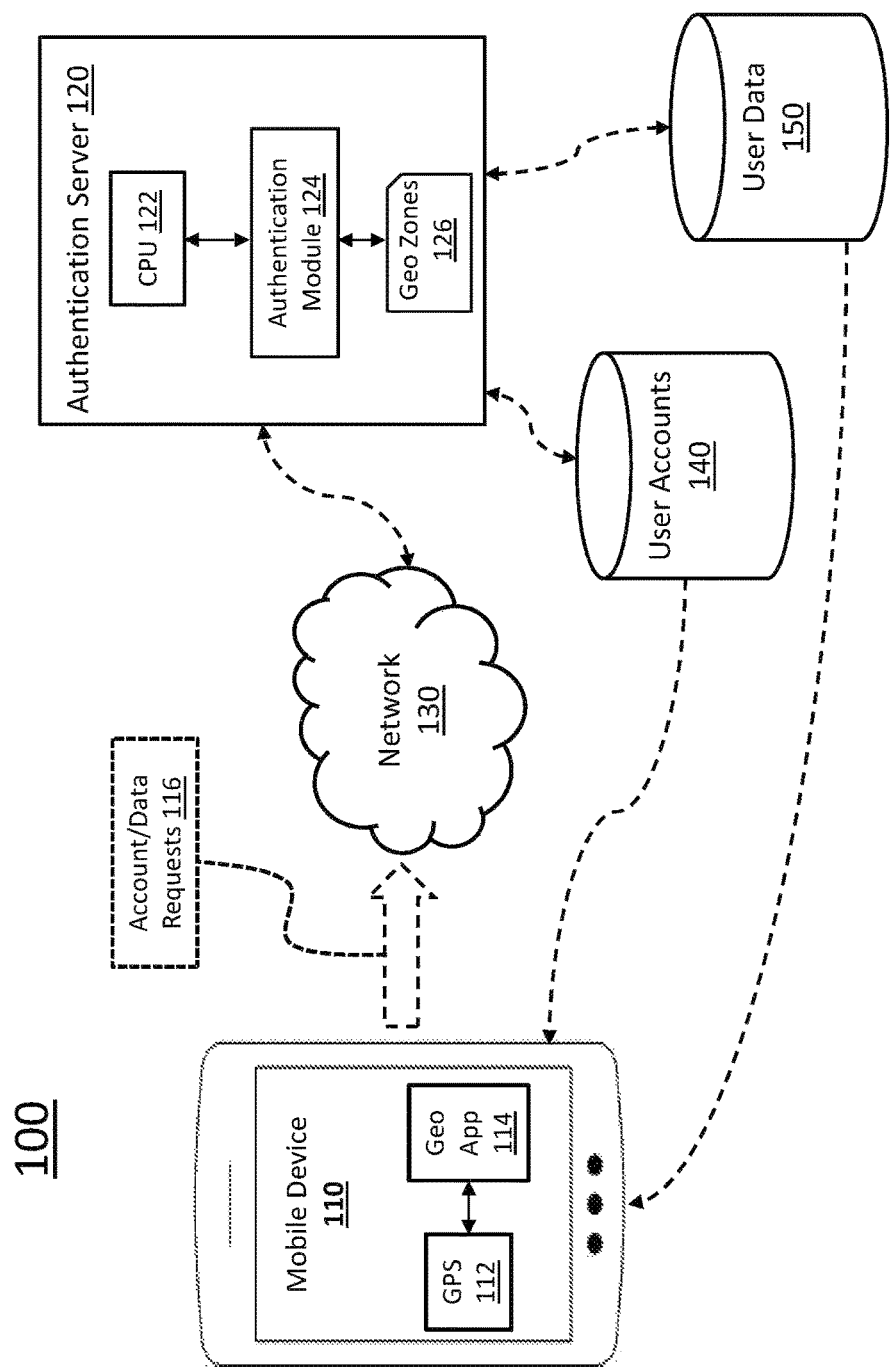
FIG. 1 illustrates a block diagram of a system for geo-location-based user authentication and data access control according to an exemplary aspect.

Various aspects of the disclosure are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the disclosure in order to provide a basic understanding thereof.

FIG. 1 illustrates a block diagram of a system for geo-location-based user authentication and data access control according to an exemplary aspect. As shown, the system 100 generally includes a mobile device 110 and an authentication server 120 that is configured to provide a user of the mobile device with access to one or more of user accounts 140 and/or user data 150. As will be described in more detail below, the mobile device 110 transmits one or more account/data requests 116 over network 130 to access user accounts 140, user data 150 and the like. It should be understood that the network 130 is any type of applicable network for communicating data and data operations and can include a communication system (not shown) that connects the various components of the system 100 by wire, cable, fiber optic, and/or wireless links facilitated by various types of well-known network elements, such as hubs, switches, routers, and the like. It should be appreciated that the network may employ various well-known protocols to communicate information amongst the network resources. In one aspect, the network can be part of the Internet as would be understood to one skilled in the art.

According to the exemplary aspect, the mobile device 110 includes a GPS ("global positioning system) or GLONASS module ("global navigation satellite system"), which are collectively referred to as GPS 112 and a special mobile location application (i.e., "Geo App 114") that is connected to the geo-location authentication server 120. The mobile application 114 allows for geo-authentication and access to user accounts 140 and/or remotely stored user data 150 based on geo-location set by a user or by a group administrator. In one aspect, the geo-location authentication module can be implemented on a common data server where the user accounts 140 and/or user data 150 reside. In general, the user accounts 140 can be any type of online banking, social media, e-commerce, etc., accounts and the user data 150 can be any type of electronic data of the user, such as financial data, electronic photographs or videos, or the like. Moreover, the user accounts 140 and/or user data 150 can reside within the authentication server 120 or, alternatively, the authentication server 120 serves as a gateway to the separate user accounts 140 and user data 150, being hosted on a separate server or even by a separate entity, for example. In either case, once the user's geo position is verified, the mobile device 110 is permitted to access the user accounts 140 and/or user data 150.

According to an exemplary aspect, a user of mobile device 110 and/or an administrator of authentication server 120 sets up "geo-zones", which are geographical areas where the user is granted access to the user accounts 140 and/or user data 150. In particular, the authentication server 120 will include one or more central processing units ("CPU") 122 provided to, among other things, execute an authentication module 124. In this aspect, the authentication module 124 includes software code (e.g., processor executable instructions) in memory, which may be configured to execute/facilitate the authentication algorithms according to the exemplary aspects described herein.

In general, as used herein, the term "module" refers to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein. For purposes of this disclosure below with respect to the exemplary algorithms, the disclosure generally refers to the computer 110 and/or CPU 212 and/or one of the specific modules as shown to perform the various steps of the algorithm.

According to the exemplary aspect, the authentication server 120 will include a database storing a plurality of the specified "geo zones" 126. The geo zones 126 will specify the approved geographical zones for which the user of the mobile device 11 can access the user accounts 140 and/or 150. That is, each user (or device) of system 110 will have an identification ("ID") and possibly a list of a plurality of electronic devices associated with the user (based on device IDs, for example). Moreover, the database will include corresponding approved geo zones and, optionally, specified time periods for when each geo zone is active (i.e., approved for the user to access accounts 140 and/or data 150). Moreover, in one aspect, the geo zones may specify different types of data and/or access rights that can be accessed according to the specified geo zones 126. For example, the user may be permitted to perform read and write actions within a specified geo zone if he or she is using a "work" device (i.e., issued by an employer), but the access rights within the geo zone for a "non-work" device 110 may be limited to read access rights, without rights to write and/or modify, delete, and the like.

In the exemplary aspect, the size and shape of each geo-zone is defined on the map as a closed area. Moreover, an arbitrary number of geo-zones can be set for one user account or for a user group. According to another exemplary aspect, the user accounts 140 and/or user data 150 are protected from attempted access from a certain geo-location, area or country, for example. Moreover, certain geo-locations or an area can be set as a temporary access area from where the access to user accounts 140 and/or user data 150 is allowed for a certain time period. For example, a user of mobile device 110 may be going on a business trip can ask the administrator of authentication server 120 to change the authorized access geo-location for the duration of the trip (e.g., limited access for one week) or to temporarily add another location for permitted access in the specified approved geo-location. In yet another embodiment, the temporary access can only allow accessing data for read access and locking the user screenshot copying capability, for example.

According to the exemplary access, the geo-location data is used for user authentication and for controlling access to user accounts 140 and/or user data 150. Advantageously, this implementation can be very useful for government organization or enterprises that do not want the employees to access their accounts from outside of the office. The geo-location authentication system and method can be used with any mobile clients accessing their data on remote servers or on a cloud, for example. For example, user data 150 can be data stored on a remote cloud storage service, such as Amazon® Simple Storage Service ("S3"), and Microsoft® Azure ("Azure").

Moreover, in certain aspects, additional authentication can include comparing access attempts times and locations. For example, the same user may attempt to access his user account 140 or user data 150 remotely from Moscow and from London within an hour. In this case the authentication server 120 can block the second access attempt, even if London is included in the list of permitted geo-locations, because the authentication server can determine (based on required time for traveling between Moscow and London) that it is not possible that the same user is performing both access requests. In this case, the access is blocked and the user of the mobile device 110 is notified of an intrusion attempt.

According to one exemplary aspect, the geo-location data can be used for backup of a user data to a local storage. In this case, the user device 110 is authenticated based on the geo-location determined by GPS 112 and then the user data can be backed up to storage. For example, when a user of mobile device 110 comes home, the mobile device 110 detects its geoposition using GPS 112 and connects to a local network accessible storage ("NAS") device in order to backup data on the mobile device 110. The NAS storage device can have a geo-location authentication component (i.e., the same as authentication module 124) running on it. The mobile device 110 can be authenticated by the local storage using the authentication module, and, then, the file synchronization, backup and sharing can be implemented by the local storage. According to one aspect, additional authentication step(s) can be used for improved security if required. For example, the mobile device 110 can be used to login into any other devices based on known geo-data. More specifically, the user typically goes to certain locations (e.g., employer's office) every day and the corresponding geo-data is recorded.

Thus, at a certain location, the user's geo-data obtained by GPS 112 can be used for automatic login into devices at this location. However, at certain locations, the users with particular geo-data are not allowed to access certain devices. For example, if a user is in Boston, the user cannot use the same servers (or applications) in New York based on their geo-location data. Moreover, in the exemplary aspect, the geo-location authentication application (i.e., the "Geo App 114") can run as a background process on all of any of the user's mobile devices 110. User access to devices and data can be defined by system administrator or by policies. Users can have different access levels at the same location.

In an exemplary aspect, once the user mobile device is authenticated based on its geo-location, the user data can be automatically backed up to another devices (or storage device). In one aspect, a mobile device 110 with the geo-location data obtained by GPS 112 can be used for entering an office or home or for using ATMs, for example. In case of backup of user mobile device data, the geo-location parameters are used to locate the nearest storage device for backup. In one aspect, some storage can be marked as not allowed based on its geo-location determined by the GPS 112. For example, if the mobile device 110 detects a nearest storage in North Korea, the backup is not performed to this storage. Instead, another nearby storage is detected and authenticated for backup of user data. In another aspect, the geo-location data can be used to unblock user computers from the mobile device.

Figure 2A:
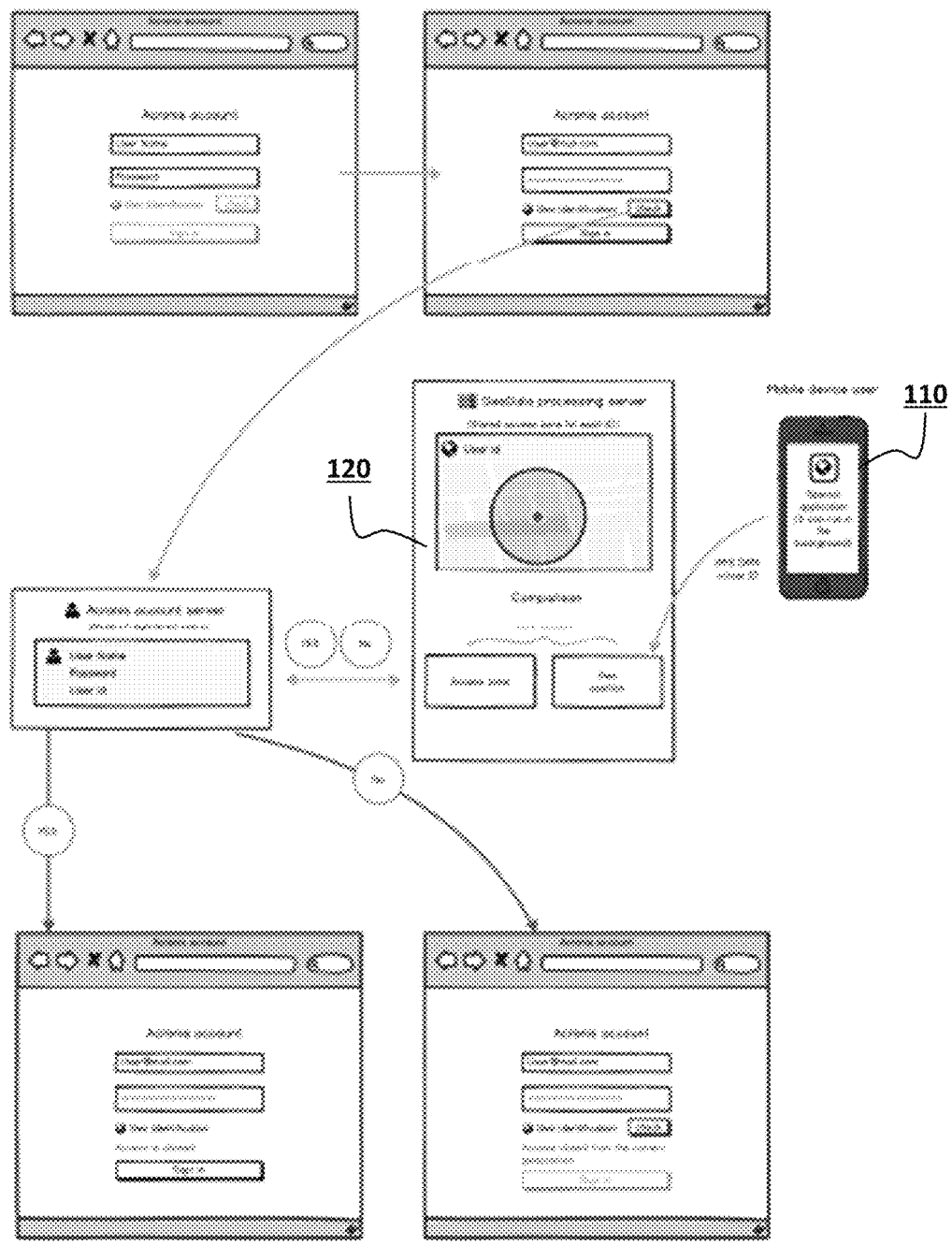
FIG. 2A illustrates a flow diagram for a user authentication scenario according to an exemplary aspect.

FIG. 2A illustrates a flow diagram for a user authentication scenario according to an exemplary aspect. In this exemplary aspect, it is contemplated that the administrator of authentication server 120 can set an access geo-zone for a user of a mobile device 110. It should be understood that the components shown in FIG. 2A provides a high-level depiction of system 100 in FIG. 1.

According to this aspect, the mobile device a geo-authentication application component (i.e., "Geo App 114") running on the mobile device 110. The Geo App 114 is a software application that is configured to acquire user current geo-location from the built-in GPS 112 of the user mobile device 110. Moreover, the administrator logs into the geo-authentication server 120 and sets an approved access geo-zone for the mobile device 110. For example, the authentication server 120 can provide a user interface that enables the administrator (or user) to define specific geographical positions or areas, as well as specified time periods, that can be considered "approved". Therefore, the administrator (or user) is effectively limited access to the protected data according to these predetermined approved geographical areas and/or time periods.

Thus, when the user of the mobile device 110 attempts to login into a user account 140 and/or access user data 150, the Geo App 114 is configured to build an access request (e.g., an electronic file) that includes a user name, a password and a user ID associated with the user and/or the user device 110 and sends the access request to the authentication server 120 alone with the current user geo-location data obtained from GPS 112. The authentication module 124 on the authentication server 120 is configured to compare the user geo-location data from the mobile device 110 against the specified access geo-zone for the mobile user. If the current geo-location data falls within the access geo-zone, the user is granted access to his account data on the server 120 upon authentication of his other credentials, including user name and password (e.g., verification by "Acronis account server" with access "allowed"). Otherwise, the access is denied (e.g., denial by "Acronis account server" with access "closed from the current geoposition"), and a notification is sent to the user (for example, to the mobile device 110). The user credentials and the current geo-location data can be encrypted on the mobile device 110 and decrypted on the server using any of the public key encryption methods.

Figure 2B:
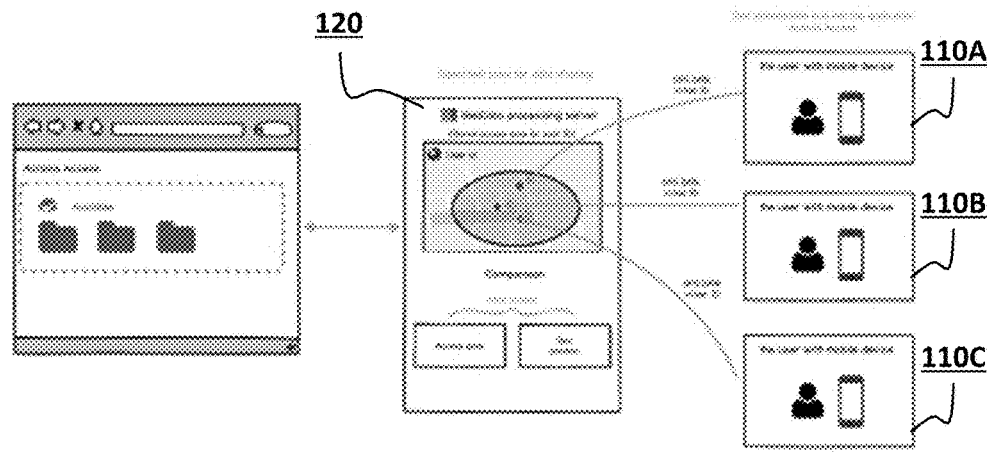
FIGS. 2B and 2C illustrate flow diagrams for a user authentication scenario according to another exemplary aspect.
Figure 2C:
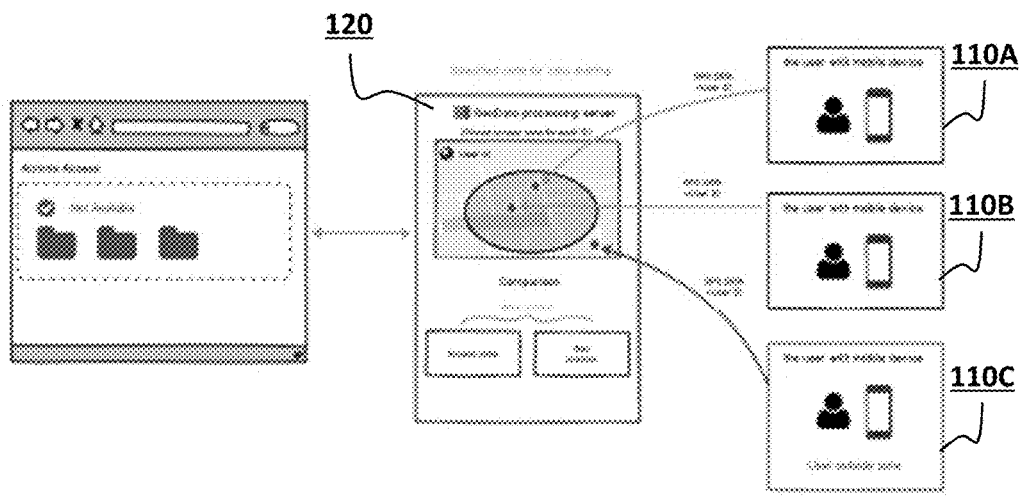

FIGS. 2B and 2C illustrate flow diagrams for a user authentication scenario according to another exemplary aspect. In this exemplary aspect, it is contemplated that several mobile users attempt to access a shared account data on one more remote servers. It should be understood that the components shown in FIGS. 2B and 2C provide another high-level depiction of system 100 in FIG. 1.

As shown in FIG. 2B, each of a plurality of the mobile devices 110A-110C have the geo-authentication application component 114 running on the respective mobile device. This application acquires user current geo-location from the built-in GPS 112 of the respective mobile devices 110A-110C. Moreover, the administrator of the authentication server 120 logs into the geo-authentication server and sets a shared access geo-zone for each of the group of mobile devices 110A-110C. When any of the users of the mobile devices 110A-110C attempts to access the shared data account by authentication server 120, the respective device will transmits an access request in a similar manner as described above that includes user name, password and user ID to the authentication server 120 alone with the current user geo-location data obtained by the respective GPS 112. The authentication component (e.g., authentication module 124) on the authentication server 120 compares the current user geo-location data against the shared access geo-zone for each of the mobile devices 110A-110C. If the user current geo-location data falls within the shared access geo-zone, each user is granted access to the shared account data provided by the authentication server 120 upon authentication of the other credentials, including user name and password.

However, as shown in FIG. 2C, if one of the users (e.g., mobile device 110C) moves outside the approved geo location, the authentication server 120 will detect this variation when the authentication module 124 compares the GPS data 112 for the mobile device 110C with the approved "geo zones" 126. If the mobile device 110C is outside the approved zone(s), the authentication server 120 will deny access to the requests account and/or data and notification will be sent to the mobile device 110C

Figure 2D:
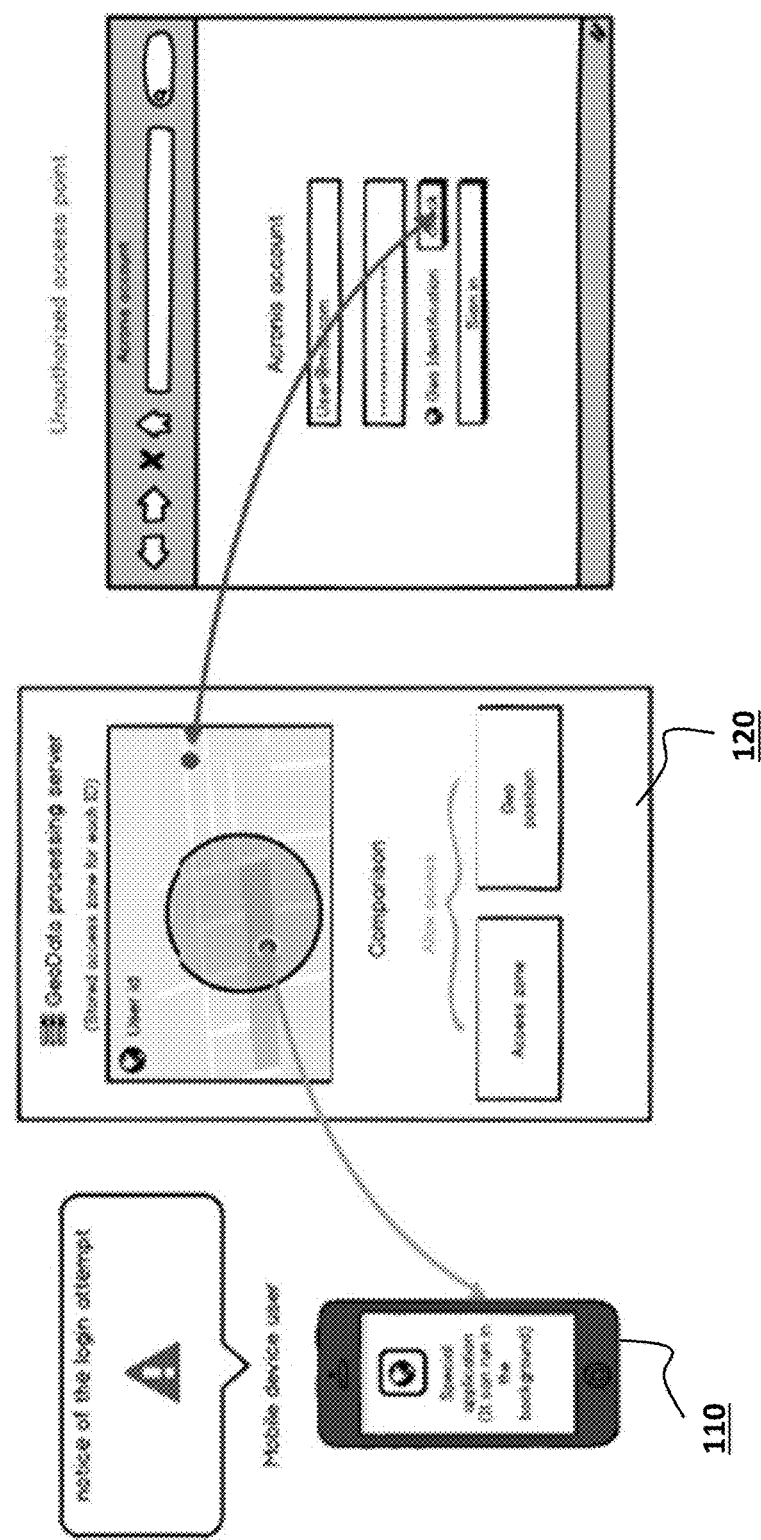
FIG. 2D illustrates a flow diagram for a user authentication scenario according to an exemplary aspect.

FIG. 2D illustrates a flow diagram for a user authentication scenario according to yet another exemplary aspect. In this exemplary aspect, it is contemplated that the user sets an access geo-zone for the mobile device 110. It should be understood that the components shown in FIG. 2D provide another high-level depiction of system 100 in FIG. 1.

Again, it is contemplated that the mobile device 110 has a geo-authentication application component 114 running on the mobile device 110. This application 114 acquires a user current geo-location from the built-in GPS device 112 of the mobile device 110, for example. Moreover, the geo-authentication server 120 can provide a user interface (e.g., a website interface) that enables the user of the mobile device 110 to log into his account and set one or more access geo-zone for his user account. For example, the user could specify that for a specific banking account (or all banking accounts), etc., can only be accessed from a certain country (e.g., the U.S.) or in a specific region (e.g., within 50 miles of Washington D.C.), for example.

In an alternative aspect, the system administrator or the user's supervisor can set up the geo-zone by using the user interface for the authentication module 124 of the authentication server 120. In either case, when the user attempts to login into his account using the mobile device 110, the access request that includes user name, password and user ID is sent to the authentication server 120 alone with the current user geo-location data obtained by the GPS 112 of the mobile device 110. The authentication component 124 on the authentication server 120 compares the user geo-location data against the user-specified access geo-zone (or geo-location) for this mobile device 110. If the user current geo-location data falls within the user-specified access geo-zone, the user is granted access to the requested user account 140 and/or user data 150 by the authentication server 120 upon authentication of the other credentials (i.e., verification of user name and password). Otherwise, the access is denied and notification is sent to the user mobile device 110.

It should be appreciated that the user credentials and the current geo-location data can be encrypted on the mobile device 110 and decrypted on the authentication server 120 using any of the public key encryption methods, for example. Moreover, if someone else makes an attempt to access the user account 40 and/or user data 150 from a different mobile device, the user will get a notification because of an access attempt made from a geo-location, which is not the same as the user-specified access geo-zone or geo-location.

Figure 3:
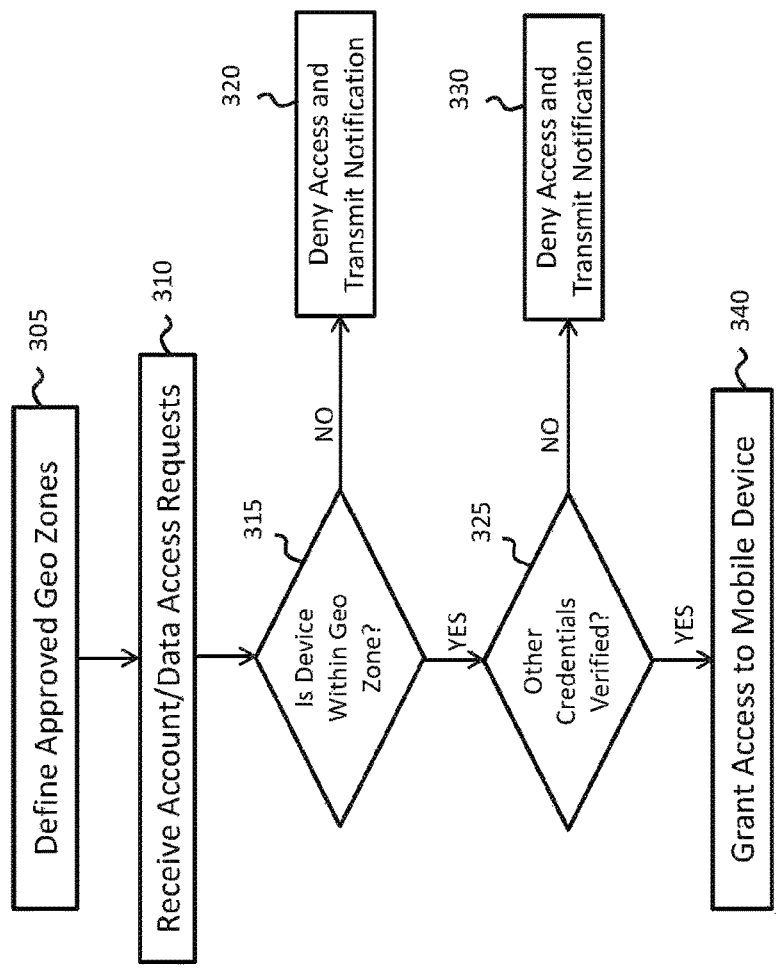
FIG. 3 illustrates a flowchart for a method for geo-location-based user authentication and data access control according to an exemplary aspect.

FIG. 3 illustrates a flowchart for a method for geo-location-based user authentication and data access control according to an exemplary aspect. As shown, initially, at step 305, the approved geo zones for one or more mobile devices 110 (e.g., smartphones, laptops, tablets, PDAs, etc.) is set by the authentication module 124 and stored as geo zones 126 in memory of authentication server 120. As noted above, the geo zones 126 can be limited to one or a plurality of specific zones on a map and set for a predetermined period of time (e.g., April $1^{st}$ to April $7^{th}$ in Moscow). Moreover, the geo zones 126 can be set by the user(s) of the mobile device 110 and/or an administrator of the authentication server 120.

Next, at step 310, the user of the mobile device 110 initiates an access request of a user account 140 and/or user data 150, for example. The access request 116 can be generated by a Geo App 114 running on the mobile device 110 and can include the current position of the mobile device 110 (obtained from GPS 112) and also the username and password (and any other information). This access request 116 is received by authentication server 120 at step 310 at which point the authentication module 124 running thereon compares the user geo position of the mobile device 110 with the approved geo zone(s) 126. If the mobile device 110 is within an approved geo zone as determined at step 315, the method proceeds to step 325. Otherwise, if the mobile device 110 is outside the approved geo zone(s), the method proceeds to step 320 where the authentication server 120 blocks the requested access to user accounts 140 and/or user data 150 and transmits a notification to the mobile device 110 as to why the access request was blocked.

Otherwise, at step 325, once the user geo position of the mobile device is confirmed by the authentication module 124 to be within an approved geo zone 126, the authentication module 120 will (optionally) verify the other user credentials including the username and password, using conventional techniques. If the username and password are not approved, the method proceeds to step 330 where the authentication server 120 again blocks the requested access to user accounts 140 and/or user data 150 and transmits a notification to the mobile device 110 as to why the access request was blocked. Alternatively, if the other credentials are verified at step 325, the authentication server 120 provides access of the requested account/data to the mobile device 110 at step 340. For example, if the authentication server 120 has direct control over the requested information, the authentication server 120 itself can transmit this information back to the mobile device 110. Otherwise, if the requested information is provided on a secondary server (e.g., if the authentication server 120 is functioning as a gateway), the authentication server 120 can transmit an approval notice to the secondary server hosting the requested information, which knows that it is safe to transmit the requested information back to the mobile device 110.

Figure 4:
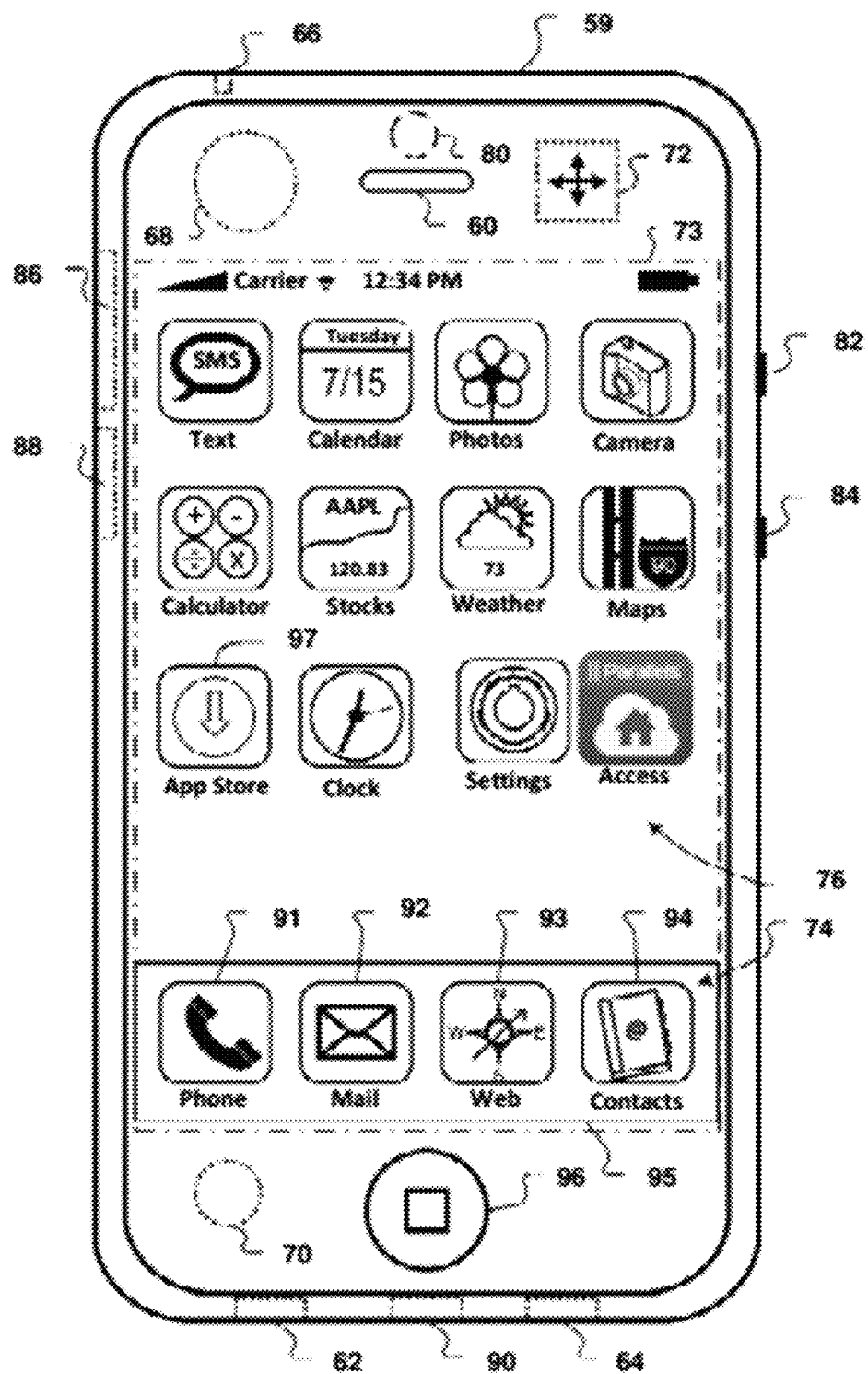
FIG. 4 illustrates a block diagram of an exemplary mobile device 59 on which the disclosed system and method can be implemented.

FIG. 4 illustrates a block diagram of an exemplary mobile device 59 on which the disclosed system and method can be implemented. The mobile device 59 can be, for example, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each corresponding device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape. In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video. The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

Figure 5:
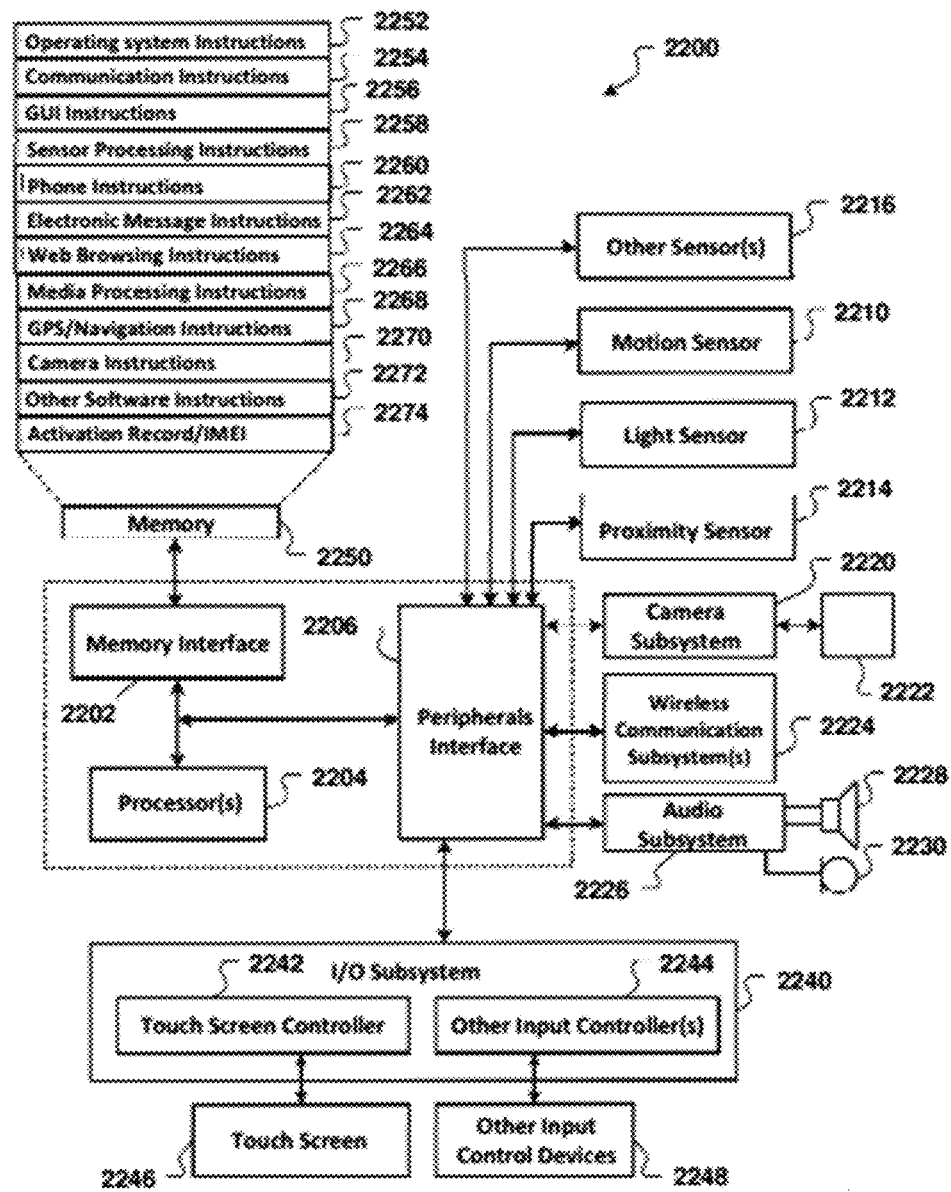
FIG. 5 illustrates an implementation of the mobile device 59 according to an exemplary aspect.

FIG. 5 illustrates an implementation of the mobile device 59 according to an exemplary aspect. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network (s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions. The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for authenticating a mobile device, the method comprising:
   receiving, from the mobile device, a request to access at least one of a user account and user data stored remotely from the mobile device, the request including current geo-location data indicating a current geographical location of the mobile device;
   determining, by a server, whether the current geo-location data is within at least one geo zone that indicates approved geographical areas where the mobile device can access the requested at least one of a user account and user data, wherein the at least one geo zone further specifies different types of access rights to the at least one of the user account and user data based on a type of the mobile device;
   granting, by the server, the mobile device permission to perform read and write actions to the requested at least one of a user account and user data responsive to determining that the current geographical location of the mobile device is within the approved geographical areas and determining that the mobile device is a work device issued by an employer of the user; and
   granting, by the server, the mobile device permission to perform read actions and not write actions to the requested at least one of the user account and user data responsive to determining that the current geographical location of the mobile device is within the approved geographical areas and determining that the mobile device is not a work device issued by an employer of the user.

2. The method according to claim 1, further comprising generating the request to access the at least one of a user account and user data by a geo-location software application running on the mobile device.

3. The method according to claim 1, further comprising providing a user interface, by the server, that is operable by a user of the mobile device and configured to define the at least one geo zones that indicates the approved geographical areas where the mobile device can access the requested at least one of a user account and user data.

4. The method according to claim 1, further comprising defining, by an administrator of the server, the at least one geo zones that indicates the approved geographical areas where the mobile device can access the requested at least one of a user account and user data.

5. The method according to claim 1, wherein the request includes user authentication credentials including a username and password, and the method further comprising:

verifying the username and password after determining that the current geo-location data is within the at least one geo zone; and causing the mobile device to obtain access of the requested at least one of a user account and user data once the username and password are verified.

6. The method according to claim 1, further comprising determining, by the server, that the request to access the at least one of a user account and user data is made within an approved time period that indicates an approved time period when the mobile device is within the approved geographical areas.

7. A system for authenticating a mobile device, the system comprising:

a server configured to receive, from the mobile device, a request to access at least one of a user account and user data stored remotely from the mobile device, the request including current geo-location data indicating a current geographical location of the mobile device; and wherein the server comprises a hardware processor configured to:

determine whether the current geo-location data is within at least one geo zone that indicates approved geographical areas where the mobile device can access the requested at least one of a user account and user data, wherein the at least one geo zone further specifies different types of access rights to the at least one of the user account and user data based on a type of the mobile device, grant the mobile device permission to perform read and write actions to the requested at least one of a user account and user data responsive to determining that the current geographical location of the mobile device is within the approved geographical areas and determining that the mobile device is a work device issued by an employer of the user; and grant the mobile device permission to perform read actions and not write actions to the requested at least one of the user account and user data responsive to determining that the current geographical location of the mobile device is within the approved geographical areas and determining that the mobile device is not a work device issued by an employer of the user.

8. The system according to claim 7, wherein the hardware processor is further configured to provide a user interface that is operable by a user of the mobile device and configured to define the at least one geo zones that indicates the approved geographical areas where the mobile device can access the requested at least one of a user account and user data.

9. The system according to claim 7, wherein the hardware processor is further configured to receive, from an administrator of the server, an indication of the at least one geo zones that indicates the approved geographical areas where the mobile device can access the requested at least one of a user account and user data.

10. The system according to claim 7, wherein the request includes user authentication credentials, including a username and password, wherein the hardware processor is further configured to:

verify the username and password after determining that the current geo-location data is within the at least one geo zone, and cause the mobile device to obtain access of the requested at least one of a user account and user data once the username and password are verified.

11. The system according to claim 7, wherein the hardware processor is further configured to determine that the request to access the at least one of a user account and user data is made within an approved time period that indicates an approved time period when the mobile device is within the approved geographical areas.

12. A mobile device comprising:

a global position system configured to generate current geo-location data indicating a current geographical location of the mobile device; and a processor configured to:

transmit a request, to an authentication server, to access at least one of a user account and user data stored remotely from the mobile device, the request including the current geo-location data, access using read and write actions the requested at least one of a user account and user data if the current geographical location of the mobile device is determined by the authentication server to be within a predetermined geographical areas where the mobile device is approved to access the requested at least one of a user account and user data and if the mobile device is determined to be a work device issued by an employer of the user, and access using read actions and not write actions the requested at least one of a user account and user data if the current geographical location of the mobile device is determined by the authentication server to be within a predetermined geographical areas where the mobile device is approved to access the requested at least one of a user account and user data and if the mobile device determined to not be a work device issued by the employer of the user.

13. The mobile device according to claim 12, wherein a geo-location software application is running on the mobile device that is configured to generate the request to access the at least one of a user account and user data.

14. The mobile device according to claim 11, further comprising a user interface that is operable by a user of the mobile device and configured to define the predetermined geographical areas where the mobile device can access the requested at least one of a user account and user data.

15. The mobile device according to claim 11, wherein the predetermined approved geographical areas are defined by an administrator of the authentication server.

16. The mobile device according to claim 11, wherein the processor is further configured to generate and transmit the request that includes user authentication credentials, including a username and password.

17. The mobile device according to claim 16, wherein the mobile device is configured to access the requested at least one of a user account and user data once the authentication server verifies the username and password after determining that the current geo-location data is within the at least one geo zone.

18. The mobile device according to claim 11, wherein the mobile device is configured to access the requested at least one of a user account and user data once the authentication server determines that the request is made within an approved time that indicates an approved time period when the mobile device is within the approved geographical areas.

19. The method according to claim 1, wherein the request is a first request and the current geo-location data is a first geo-location data, wherein the method further comprising:

receiving, from the mobile device, a second request to access the at least one of a user account and user data stored remotely from the mobile device, the second request including second geo-location data indicating a second geographical location that is different from the first geo-location data;

calculating a time between receiving the first and second requests;

determining whether the second geo-location data is within at least one geo zone that indicates the approved geographical areas; and responsive to determining that the second geographical location is determined to be within the approved geographical areas and determining that the calculated time between the first and second requests is less than a threshold time, causing the mobile device to block access of the requested at least one of a user account and user data.

* * * * *